Nov. 3, 1931.    C. T. MYERS    1,830,480
MEANS FOR TRANSFERRING LUBRICANT
Filed Jan. 18, 1930
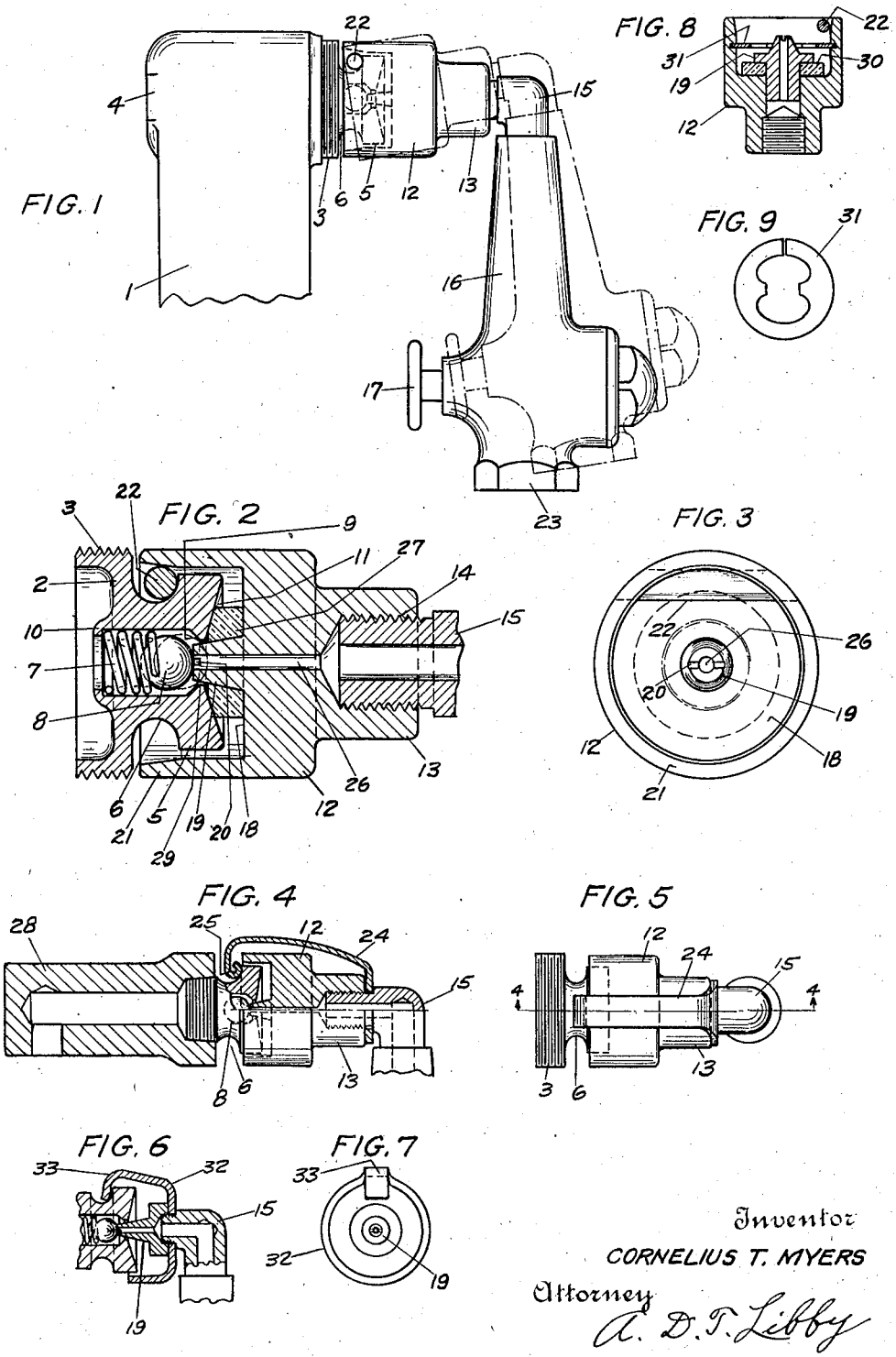
Inventor
CORNELIUS T. MYERS
Attorney
A. D. T. Libby Patented Nov. 3, 1931

1,830,480

UNITED STATES PATENT OFFICE

CORNELIUS T. MYERS, OF RAHWAY, NEW JERSEY

MEANS FOR TRANSFERRING LUBRICANT

Application filed January 18, 1930. Serial No. 421,663.

This invention relates to means for conveying lubricant from one container to another or to a member having a surface to be lubricated, such for example, as on the chassis of an automotive vehicle. The invention includes in combination a special design of cap for the container to be filled, or the member to be lubricated, and a coupler device which can be quickly attached to the cap and the container or member having the surface to be lubricated, charged with lubricant held under pressure in a separate container adapted to be connected to the coupler in any satisfactory manner.

It is one of the objects of my invention to provide an attachment device for filling magazine oilers of my previous designs or other similar devices in a quick and expeditious manner.

Another object of my invention is to provide a filling attachment which will prevent the lubricant at the time of the filling operation from spraying back when the coupler or connector is removed before the control valve is closed.

Another object of my invention is to minimize dripping of the lubricant when removing the coupler.

Another object of my invention is to provide a filling attachment combination which is simple and cheap to manufacture and one that is easy to operate.

These and other objects will be clear to one skilled in such matters after a reading of the specification taken in connection with the annexed drawings, wherein:

Figure 1 is an elevational view of one form of the lubricant supplying means in combination attached to a magazine oiler, only the upper portion of which is shown. This view also shows in dotted lines the initial position of application of the device to the magazine cap.

Figure 2 is a sectional view on an enlarged scale of one form of the arrangement.

Figure 3 is an end view of one form of the coupler member included in the said means.

Figure 4 is a part-sectional and part-elevational view somewhat similar to Figure 2, but showing a modified form of one of the attachment parts connected to a member to be lubricated directly.

Figure 5 is a view of Figure 4 looking down from the top, but without the member to be lubricated, the cap being like that of Figure 2.

Figure 6 shows a further modified form of attachment means somewhat different from that shown in Figure 4.

Figure 7 is an end view of the coupler shown in Figure 6.

Figure 8 is a part-sectional view through another form of coupler.

Figure 9 is a plan view of the tip-retaining ring shown in Figure 8.

Referring now to the details, 1 is a lubricator having a cap 2 with threads 3 at one end which are adapted to cooperate with threads in the lubricator 1 or the bolt 28 shown in Figure 4, to hold the cap securely in position. The lubricator 1 is adapted to be attached to any member to be lubricated and to which the same is applicable, the attaching means not being shown.

The cap 2 is provided on the end opposite the threads 3, with an outer shoulder 5. This shoulder 5 is preferably an annular one and may be knurled or provided with a pin for assisting in screwing the cap into position. This shoulder or pin also acts as a fulcrum for the coupler to be later described. Between the shoulder or its equivalent functional part and the threaded portion 3, an annular groove 6 is provided. The cap 2 has its central portion hollowed out to receive a spring 7 and a ball 8, which is adapted to fit against the valve seat 9. After the spring 7 and ball 8, comprising the valve, have been inserted in the hollow portion of the cap, the material 10 is spun over to provide a flange seat for the spring 7.

The outer end of the cap 2 is preferably provided with a conical surface 11, although such form of surface is not necessary and may not be used in practice, the apex of which is in the axial center of the cap and adjacent the seat 9. It will be understood that there is a round opening 29 through the wall of the cap 2 adjacent the seat 9 whereby the valve 8 may project slightly into the area of the cone surface 11, but the valve need not so project.

For cooperation with the cap 2 as above described, there is a coupler 12 which preferably has a shank 13 threaded at 14 to receive a fitting 15 to which is attached a source of lubricant supply preferably controlled by a valve 16 having a hand-operated trigger 17. The coupler 12 may have a shield portion 18, from the center of which projects a cone-shaped tip 19. The end of the tip 19 preferably has a transverse slot 20 for the purpose to be later pointed out, but this slot is not absolutely required if the spring 7 is comparatively weak.

Preferably, the shield 18 has projecting therefrom an annular skirt 21, which in the form shown in Figure 2, is adapted to extend over the shoulder 5 of the cap 2. Mounted transversely across the interior of the skirt 21, is a pin 22, and when the parts are assembled, the pin 22 is preferably in the upper part of the coupler member 12, as shown in Figure 1.

The valve 16 is adapted to be connected at the end 23 by a flexible pipe to a tank or container which contains lubricant under pressure.

In the operation of my device, when it is desired to fill the magazine 1 with lubricant, the operator takes the valve 16 in his hand, to which the coupler 12 is already attached, and hooks the pin 22 over the shoulder 5 or an equivalent thereof on the cap 2, so that the pin rests in the groove 6, as shown in Figures 1 and 2. This initial position is shown by dotted lines in Figure 1, and in this position, the end of the tip 19 is in engagement with the valve 8. Since the coupler 12 is now fulcrumed on the pin 22 in the groove 6, it will be readily understood that a very slight force applied by the hand to the valve 16, moves it to the position shown in full lines in Figure 1, in which position the tip 19 forces the valve 8 off its seat 9 and seals the opening 29, and the filling operation is ready to begin.

The operator then by pressure of a finger on the trigger 17, opens the check in the valve 16 and the lubricant which is under pressure in the container, as previously mentioned, will be forced through passage 26 to the tip of the coupler, past the valve 8, into the interior of the lubricator 1, or into the passages in the pin 28. In order to insure free passage of the lubricant past the valve 8, the tip 19 may be slotted at 20, or provided with a suitable projection to keep the valve 8 from closing the hole 26. When the magazine 1 is full, the trigger 17 is released and the coupler unhooked from the cap, when the valve 8 under the action of the spring 7, will return to the seat 9, thereby closing the opening 29.

Due to the fact that the lubricant is under pressure, the withdrawal of the tip 19 from the cap before the trigger 17 is released, will cause some oil to fly outwardly from the opening of the cap, or back pressure within the cap may do the same thing. To prevent the lubricant from hitting the operator, the coupler is provided with the shield 18 and also preferably with the complete skirt 21, as shown in Figure 2, or a seal ring 27 may be used which is a very effective way of taking care of this.

As shown in Figures 4 and 5, the pin 22 is replaced by a spring 24, only one form of which is shown, and which may be held in position between the shank 13 and the fitting 15, although it may be attached directly to the coupler member 12. The spring 24 may pass over the exterior of the coupler 12, and has its end 25 preferably formed as shown in Figure 4, so as to fit over the shoulder 5 of the cap 2. The use of the spring 24 compensates for any variations in the manufacture which are apt to occur by the use of the pin 22, which must be fairly accurately located with respect to the end of the tip 19, and with respect to the shoulder 5 on the cap 2, and with respect to the hole 29. By using a spring such as 24, the same may be quickly adjusted so that the tip 19 will seal the hole 29.

While I have indicated that the shoulder 5 need not be a complete annular shoulder, yet this is preferable, and the same thing may be said of the skirt 21.

It will be observed that my attachment device may be applied to the cap in any arcuate position, but due to the type of lever action, a very small force on the part that is attached to the coupler 12 is required to move the coupler to the filling position: that is, to force the valve 8 off its seat as shown in Figures 2 and 4, and to seal the opening 29 ready to send the lubricant through the cap into the receptacle or passageway to receive it.

In order to minimize any drippage or leakage of lubricant around the cone-tip 19 when it is being seated or removed from its seat on the surface 11, a seal ring 27, made of a suitable compressible substance, may be removably fastened to the shield 18 or the cone-tip 19.

In Figure 6, I have shown a form of coupler in which the tip 19 connects directly to the fitting 15, while a cup-shaped member 32 is supported as shown. The member 32 has a projecting part 33 formed to correspond to spring 24 of Figure 4, to fulcrum on the cap.

Figure 8 shows a construction of the connector in which the tip is slidably mounted and a ring 30 of springy or flexible material which allows for the small variations in manufacturing dimensions. A retaining snap ring 31 fitting in a groove in the skirt 21 keeps the tip from dropping out, but other means could be used to guard against this.

While I have shown the hook member which engages the shoulder on the cap as being one which acts automatically, it will be understood that the hook member may be pivotally mounted either on the coupler 12, or connected parts 15 or 16, and be operated manually.

It will be apparent that the details for carrying my invention into practice may be varied without departing from the spirit of my invention or the scope of the appended claims.

Having thus described my invention, what I claim is:

1. Means for filling a lubricant holding member including; a cap fastened to said member, a valve positioned within the cap and normally closing an opening thereinto, said cap having a fulcrum element; a combined coupler and shield, said shield having a depending skirt, a hook member carried by the skirt to engage said fulcrum element and a tip to engage said valve and unseat the same, said tip extending from the shield in a direction toward the hook and being formed to enter and close the opening left by unseating the valve when the coupler is pivotally moved about said fulcrum, and means for controlling a supply of lubricant under pressure to said tip.

2. Means for passing lubricant to a lubricant holding member having a cap; said cap being hollow and having a valve seat in one end of the cap and resilient means within the cap for normally holding said valve against its seat, said cap also having a fulcrum adjacent the valve seat; a filling attachment device comprising a coupler having at least a shield portion and an annular skirt extending from the shield, a hollow cone-shaped tip fastened to and extending outwardly from said shield portion, said shield being provided with means for attaching a lubricant supply means thereto, said tip adapted to engage said valve and force it off its seat and to close the opening left by the valve which is the filling position, and means carried by the skirt for engaging said fulcrum on the cap so the coupler will fulcrum thereon whereby a slight force on the coupler and the lubricant supply means attached thereto will cause said tip to take the filling position above described.

3. Means for passing lubricant to a lubricant holding member having a filling cap; said cap being hollow and having a valve seat in one end of the cap and resilient means within the cap for normally holding said valve against its seat, said cap also having a fulcrum adjacent the valve seat; a filling attachment device comprising a coupler having a shield and a skirt and a hollow cone-shaped tip associated with and extending from said shield in the same direction as the skirt, a seal ring around said tip, said shield being provided with means for attaching a lubricant supply member thereto, said tip adapted to engage said valve and force it off its seat and to close the opening left by the valve which is the filling position, and means associated with said coupler for engaging said fulcrum on the cap so the coupler will fulcrum thereon whereby a slight force on the coupler and the lubricant supply means attached thereto will cause said tip to take the filling position above described.

4. Means for passing lubricant to a lubricant holding member having a filling cap; said cap being screw-threaded at one end to screw into the lubricant holding member and having an annular shoulder at its opposite end, said cap having a conical-shaped outer end surface with said shoulder at the base and the apex of the cone terminating adjacent a valve seat, said cap being hollow and having a valve seat adjacent said apex, a valve and spring within the hollow part of the cap, said spring acting on the valve to normally hold it against said seat; a filling attachment device comprising a coupler having a shield and a skirt and a hollow cone-shaped tip associated with and extending from said shield in the same direction as the skirt, said shield being provided with means for attaching a lubricant supply member thereto, said tip adapted to engage said cap and force it off its seat and to close the opening left by the valve which is the filling position, and means associated with said coupler for engaging said shoulder on the cap so the coupler will fulcrum thereon, whereby a slight force on the coupler and the lubricant supply means attached thereto will cause said tip to take the filling position above described.

5. Means for passing lubricant to a lubricant holding member having a filling cap; said cap being hollow and having a valve seat in one end of the cap and resilient means within the cap for normally holding said valve against its seat, said cap also having a fulcrum adjacent the valve seat; a filling attachment device comprising a coupler having a shield and a skirt and a hollow cone-shaped tip associated with and extending from said shield in the same direction as the skirt, said shield being provided with means for attaching a lubricant supply member thereto, said tip adapted to engage said valve and force it off its seat and to close the opening left by the valve which is the filling position, and a spring carried by said coupler exterior to said skirt and having its end formed to engage the fulcrum on the cap so the coupler will fulcrum thereon, whereby a slight force on the coupler and the lubricant supply means attached thereto will cause said tip to take the filling position above described.

6. An attachment device for filling a lubricant holding member having a hollow filling cap with a spring-seated valve within the hollow part and having an exterior fulcrum; including a coupler element having a shield portion and a skirt extending from the shield portion, a hollow conically-shaped tip extending from the shield within the confines of the skirt, said tip having a transverse slot in its end, said shield being provided with a passageway connecting with the tip, and means associated with said coupler and adapted to be hooked over said fulcrum on the cap, whereby said tip will engage said valve and a slight force on the coupler or lubricant supply means attached thereto will cause said coupler to pivot on the cap and cause the tip to force said valve off its seat and the tip into the opening made by unseating the valve as and for the purpose described.

7. An attachment device for filling a lubricant holding member having a hollow filling cap with a spring-seated valve within the hollow part and having an exterior fulcrum; including a coupler element having a shield portion and a skirt extending from the shield portion, a hollow conically-shaped tip carried by the shield within the confines of the skirt, said tip having a transverse slot in its end, said shield being provided with a passageway connecting with the tip, and means for attaching a lubricant supply means thereto, a spring member associated with the coupler and extending adjacent the skirt and having its free end formed to fit behind said fulcrum whereby the coupler can be hooked over the fulcrum and the tip be brought against the valve and whereby a slight force applied to the coupler will cause the same to fulcrum on the cap and cause the tip to force the valve off its seat and to close the opening made by the unseating of the valve, for the purpose described.

8. Means for filling a lubricant holding member including; a cap fastened to said member, a valve positioned within the cap and normally closing an opening thereinto, said cap having a fulcrum element; a coupler having; a shield, a skirt and a hook member attached to the skirt, and a tip resiliently carried by the shield portion of the coupler; means for preventing the tip from being dislodged from its seat, said tip being formed to enter and close the opening left by unseating the valve when the coupler is pivotally moved about said fulcrum, and means for controlling a supply of lubricant under pressure to said tip.

9. Means for filling a lubricant holding member including; a cap fastened to said member, a valve positioned within the cap and normally closing an opening thereinto, said cap having a fulcrum element; a coupler having; a shield, a skirt and a hook member attached to the skirt, and a tip resiliently carried by the shield portion of the coupler, said skirt having a groove therein; a snap ring to enter said groove to prevent the tip from being dislodged from its seat, said tip being formed to enter and close the opening left by unseating the valve when the coupler is pivotally moved about said fulcrum, and means for controlling a supply of lubricant under pressure to said tip.

10. Means for transferring lubricant from one container to another comprising; a cap fastened to the container to be filled, a valve carried by the cap, said cap having a fulcrum element, a coupler having a hook to engage the fulcrum, said coupler carrying a tip, the hook being resiliently connected through the coupler to the tip, means for controlling a supply of lubricant to said tip, said tip adapted to unseat said valve and close the opening leading to said valve when said hook is engaged with said fulcrum and the coupler is moved on said fulcrum for the purpose described.

11. Means for filling a lubricant holding member including; a hollow cap having an opening in the head thereof and fastened to said member, a valve positioned within the hollow part of the cap and spring-pressed to normally close said opening, said cap also having a fulcrum element thereon, a coupler carrying a hook to engage said fulcrum element and a cone-shaped tip to engage said valve to unseat the same and fill said opening in the cap when the coupler is placed in hooking position on the cap and moved about the fulcrum, and means for insuring that the cone-shaped tip will properly seat itself in said opening when the coupler is moved about the fulcrum, said means comprising a resilient connection through the coupler, between the hook and the tip.

In testimony whereof, I affix my signature.

CORNELIUS T. MYERS.